United States Patent
Oldroyd

(10) Patent No.: US 7,580,591 B2
(45) Date of Patent: *Aug. 25, 2009

(54) METHOD FOR GENERATING A SYNTHETIC PERSPECTIVE IMAGE

(75) Inventor: Lawrence A. Oldroyd, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 790 days.

This patent is subject to a terminal disclaimer.

(21) Appl. No.: 11/174,036

(22) Filed: Jul. 1, 2005

(65) Prior Publication Data
US 2007/0002138 A1 Jan. 4, 2007

(51) Int. Cl.
*G06K 9/32* (2006.01)
(52) U.S. Cl. .................. 382/294; 382/295; 382/296
(58) Field of Classification Search .................. 382/294
See application file for complete search history.

(56) References Cited

U.S. PATENT DOCUMENTS

| | | | |
|---|---|---|---|
| 4,635,293 | A | 1/1987 | Watanabe |
| 4,970,666 | A | 11/1990 | Welsh et al. |
| 4,988,189 | A | 1/1991 | Kroupa et al. |
| 5,173,949 | A | 12/1992 | Peregrim et al. |
| 5,495,540 | A | 2/1996 | Frankot et al. |
| 5,550,937 | A | 8/1996 | Bell et al. |
| 5,647,015 | A | 7/1997 | Choate et al. |
| 5,995,681 | A | 11/1999 | Lee et al. |
| 6,266,452 | B1 | 7/2001 | McGuire |
| 6,512,857 | B1 * | 1/2003 | Hsu et al. ............ 382/294 |
| 6,738,532 | B1 * | 5/2004 | Oldroyd ............ 382/294 |
| 6,795,590 | B1 | 9/2004 | Chen |
| 2002/0012071 | A1 * | 1/2002 | Sun ..................... 348/578 |
| 2005/0147324 | A1 | 7/2005 | Kwoh |

FOREIGN PATENT DOCUMENTS

| | | |
|---|---|---|
| EP | 0841537 | 5/1998 |
| WO | WO 99/18732 | 4/1999 |

OTHER PUBLICATIONS

Great Britain Search Report for Application No. GB0613187.4 dated Nov. 1, 2006.
Woo, Neider, Davis, Shreiner. "OpenGL Programming Guide," 3rd Ed., Addison Wesley, Inc., 1999, pp. 127-128; p. 674.
SoftPlotter User's Manual, Vision International, Autometrics, Inc. (now part of The Boeing Company), 1994, pp. 9-1ff.
Digital Point Position Data Base Performance Specifications, MIL-PRF-89034, 1999.
Map Projections—A Working Manual, U.S. Geological Survey Paper 1385, 1987, pp. 145-153.

* cited by examiner

*Primary Examiner*—Yosef Kassa
*Assistant Examiner*—Edward Park
(74) *Attorney, Agent, or Firm*—Harness, Dickey & Pierce, P.L.C.

(57) ABSTRACT

A method of generating a synthetic perspective image that matches the viewing perspective and internal geometry of a known image sensor, for example, a forward-looking infrared sensor or a synthetic aperture radar sensor, without using specialized hardware and without the computational difficulty inherent in standard image generating means is provided. The synthetic perspective image is generated in a forward mapping process, which solves the problems of complete mapping of the perspective image and of hidden surfaces, in a manner that provides sufficient speed and adequate quality or accuracy for standard reference images to be used in registering with the sensor images.

21 Claims, 4 Drawing Sheets

METHOD FOR GENERATING A SYNTHETIC PERSPECTIVE IMAGE

BACKGROUND OF THE INVENTION (1) Field of the Invention

The present invention pertains to a method of generating a synthetic perspective image of a location, to closely match the appearance of an electronically sensed image of the location. The synthetic perspective image is constructed from a corresponding database stored reference image of the location, and a corresponding database stored reference digital elevation model of the location. The reference image is comprised of rows and columns of pixels to which elevation values obtained from the digital elevation model have been associated, and the reference image pixels are each mapped to pixels of a synthetic perspective image display.

(2) Description of the Related Art

Modern military aircraft require a capability to target, from the aircraft cockpit, precision-guided weapons. One method to do this is to use sensor images obtained by sensors carried on the aircraft. However, making an on-board sensor highly accurate, so that targets can be located within a ground coordinate system with sufficient accuracy using the image produced by the sensor, is difficult and expensive. These problems can be overcome by registering the sensor image with a geographically aligned image obtained from a reference image database prepared beforehand. When image registration is done with sufficient accuracy, the geographic alignment of the reference can be applied to the sensor image, to thus obtain sufficient geographic accuracy for target points selected from the sensor image.

A similar application involves automated guidance of a robot, such as the robot arm of the Space Shuttle or any remote manipulator, or an autonomous mobile robot, where a precise goal point for motion is identified in a sensor image, but its precise location must be obtained in the scene area imaged by the sensor. If a reference image of the scene area, with an associated three dimensional model of the scene, such as a computer aided design model, is registered with the sensor image, it is possible to determine precisely the desired point locations in the scene area, in coordinates of the scene model.

Registering a sensor image with a reference image, however, is difficult, because the reference image and the sensor image will present different views of the scene, in many useful applications. The two images will differ in perspective, as they represent two views of the scene area surrounding a point of interest or target from different vantages or viewpoints. The different perspectives of the two images produce mismatched geometrical structures in the images. For example, objects observed from the front in one scene may be seen from the back in the other, with the relative placement of surrounding objects reversed. Differences in elevation or heights across the scene area also induce geometrical differences between different views. These geometrical differences make it exceedingly difficult or even impossible to directly accomplish the precise image matching needed to achieve accurate registration between images of different perspectives.

Geometrical differences between a sensor image and a reference image can be reduced by transforming the reference image into a synthetic perspective image that simulates the same viewpoint as the sensor image. To accomplish this requires that the reference image have a three dimensional location, such as longitude, latitude, and elevation, associated with each of its pixels. Three dimensional coordinate data of the scene allows proper mapping of pixels between the reference and the synthetic perspective image during its generation. A geocoded reference image, in which each pixel is associated with a specific location and elevation in a geographic coordinate system, or a model-coded reference image, in which each pixel is associated with a specific three dimensional location in a model coordinate system, is a suitable data source.

An additional requirement is knowledge of the location of the sensor, its line of sight to the scene, and any rotation around its line of sight to the scene that may be shown in the sensor image. Correspondingly one may use knowledge of the location of the sensor and of one point in the scene, such as the point in the scene area at the center of the sensor image, in order to derive the first two, with the image rotation being separately determined. These locations need not be known to particularly great accuracy, as long as the range from the sensor to the scene, or between the viewpoint and scene point, is sufficiently large. Knowledge of the rotation angle to an accuracy of less than 1.5 degrees is preferred, and can be accommodated by existing image match processes. It is useful to notice that many sensors, particularly those used for imaging of Earth scenes from aircraft, function so that the images they collect have little or no rotation. Better knowledge of the scene point will make the image matching process easier, as the search area to determine the best match point will be made smaller. Better knowledge of the scene image rotation can be used to improve the match quality.

This transform into a synthetic perspective may also be used to insert geometrical distortions so as to better model image geometry differences arising from the sensing mechanisms, themselves, as is common with reconnaissance reference collectors and tactical sensors. This is particularly useful if the sensor and the collector that obtained the reference image are of substantially different types, or if the reference image has a processed form, such as an orthographic projection, that is not representative of any specific sensor. For example, if the sensor lens is known to distort its image, such as with a barrel or fisheye distortion, such additional distortion can be included in the transform. It is also possible to emulate distortions for entirely different sensor types, such as a synthetic aperture radar image (SAR "map"), by transforming the reference image to resemble the geometrical form of a SAR map.

The image matching process used to obtain sensor-to-reference image registration may also be made more robust and accurate by adjusting the radiometry of the transformed reference image, to more closely resemble that of the sensor image. Preferably, however, a match algorithm that is relatively insensitive to radiometry, such as the General Pattern Match algorithm described in U.S. Pat. Nos. 5,809,171, 5,890,808, 5,946,422, 5,982,930 and 5,982,945, would be used.

Fortunately, a perfect match of viewpoint and sensor geometry is not needed, because small differences are tolerated by many image match processes, and the match process anticipated to use synthetic perspective images generated by this invention is expected to be robust to small differences. In general, match complexity increases dramatically when the registration process must try to discover multiple unknown distortions that may exist between the images. In the simplest case, the only difference is that the sensor image is shifted by some, small amount of rows or columns, in relation to the reference image. The registration process operates to determine the optimal shift that will cause the images to best match. In the more complex case, such as when the two images exhibit different perspectives, a registration process can attempt to determine an optimal distortion to apply to one of the images, to obtain a best match, but the computation burden of dealing with more than simple offset shift is usually sufficient to make the process too slow to be useful.

The most pervasive use of synthetic perspective images is for rendering visualizations of a scene, and allowing an observer viewing the rendered visualizations to freely manipulate the apparent view, to provide a walkthrough or flythrough of the scene area. This requires extremely powerful computation methods and apparatus, because the need to freely "roam" around the scene or location viewed, and to see the view of the scene or location change in real time as the viewpoint is moved by a user, requires constant construction of synthetic perspective views of the scene at a rate perhaps to supply a new, different view for each frame in the video signal, at 30 video frames per second, as the viewpoint changes steadily.

There are two particularly difficult and demanding aspects of this. One is to determine which pixels in the reference image are associated with which pixels in the synthetic perspective image, so that the image data from the reference pixels can be used to produce the image data for the corresponding pixels in the synthetic perspective image. The other difficult aspect is determining when a particular pixel, or location in the scene, is actually visible from the current viewpoint, a problem known as the "hidden surface" problem. Both problems are usually solved by introducing a triangular tesselation of the surface being viewed, and painting the image as corresponding triangular tesselations onto the surface triangles, using a mathematical mapping that defines the spatial relationship between the image and the three-dimensional surface.

The pixel correspondence aspect involves two parts. One part is to perform the correspondence in a way that will assuredly assign values to each pixel in the synthetic perspective image. The other part is to actually determine the pixel correspondences. The assured assignment of all pixels in the synthetic perspective image is provided by computing by a backward projection, in which each pixel location in the synthetic perspective image plane is mapped onto a location in one of the triangles of the tesselation. Identifying the particular triangle is the most difficult part, because it involves detecting intersections between potentially millions of triangles with a single line, extending from the particular pixel in the synthetic perspective image being assigned a value, into the reference image, according to the projection method being used. When multiple detections occur, only the one closest to the viewpoint must be selected, as the others represent obscured points. This difficult detection problem must be solved for each pixel in the synthetic perspective image, compounding the difficulty. Alternatively, all the potentially millions of triangles of the tesselation are individually rendered to the synthetic perspective image, along with a Z-value for each pixel representing distance from the viewpoint to that pixel. If a pixel being rendered from a triangle has a larger Z-value than the Z-value of a previously rendered pixel at the pixel location being currently rendered, the current pixel is not rendered, as it represents an obscured point in the reference image.

The hidden surfaces are determined by examining the three dimensional surface normal vector of each of the potentially millions of triangles. If the surface normal is directed away from the viewer's location, the triangle surface is "hidden", and thus is not put onto the display. These are very computationally demanding processes for the image displays presently available, with sizes of 1,024 columns by 768 rows and larger. However, special computer hardware capabilities have been developed in video graphics adaptors to produce these scenes at video rates.

The invention described here overcomes these computational difficulties, using methods to be described below.

The use of such graphics adaptors, such as those implementing the OpenGL graphics standard, may be limited in many situations, because of the unsuitability or unavailability of the adaptors for use in aircraft and other operating environments which are subject to various environmental extremes, such as temperature and vibration. Another limit is in the size of images that they can process, because graphics adaptors are usually designed for video display applications, providing only processing and storage capabilities suited to the common sizes of such displays which may be no bigger than 2048 columns by 2048 rows, and can not be effectively applied to larger images. Cost limitations may also prohibit the use of such graphics adaptors, when an application can be suitably implemented using available on-board computing resources and a novel processing design of less complexity. Or, the graphics adaptors offering the desired capability may simply not be available on the aircraft or in the environment for which the perspective image process is to be implemented.

The invention described here allows preparation of synthetic perspective images without need to use a graphics adaptor, or specialized processing capability.

The data for such a simulated fly-through is typically a database containing a digital image of the location area, and a digital elevation model, presented as an array or matrix of heights or elevation values, that represents a three-dimensional depiction of the location area. The digital elevation model (DEM), and the accompanying digital image of the location are put into mathematical correspondence with each other. The correspondence is such that each pixel in the digital image can be associated with a specific three-dimensional position in the location area, derived from the DEM. The DEM is a rectangular array of rows and columns of height or elevation values, called "posts", and is similar in organization to an image array. The rows and columns of a DEM correspond to two dimensions of the three-dimensional depiction, and are commonly related to longitude and latitude values when the DEM reflects a location in a geographic coordinate system. The value of each post then provides the third dimension coordinate in the three-dimensional depiction. The existence of this correspondence is crucial to proper generation of synthetic perspective images.

The preferred practice is to have one DEM post associated with each pixel, so that there is a one-to-one association of image pixels and DEM posts. Since a DEM commonly has relatively lower spatial resolution than the image used as a reference, it is usually necessary to increase the spatial resolution of the DEM, by resampling it to the spatial resolution of the reference image. A DEM may alternatively have higher resolution, in which case downsampling would be done. Either of these resampling processes are done by standard techniques from existing art, and may be performed either as a pre-processing step for the entire DEM array, before the data is used for flythrough display, or during the flythrough as perspective views are generated. The selection of when the resampling occurs depends on how much storage of resampled data can be accommodated, versus how much time is available to do resampling during the flythrough display activity.

The typical sensor image is comprised of rows and columns of pixels which are recorded in a computer memory and shown on a display screen. It is obtained by a sensor from a particular viewing location, and presents a perspective view of the scene observed from that location by that sensor. The perspective image reflects sensor characteristics that must be known, in order to construct a synthetic perspective image that can be readily matched with the sensor image. For example, principal among these would be the focal length of the sensor, for an optical-type imaging sensor. The objective of the invention described here is to reproduce a view of the scene by a given sensor under known conditions, using a reference image and DEM.

However, known reference image databases cannot generally provide images that match the viewing perspective from the aircraft for all possible target sensing situations. The reference image databases usually provide a single, common, usually overhead viewing perspective. Thus, any registration performed directly between the reference image and the sensor image would be between images having different viewing perspectives and different geometric distortions. Matching between these images of different geometric distortions, such as between images of different viewing perspectives, or between images with different internal geometries, such as the internal geometries of the FLIR and SAR, is generally difficult to achieve, and at best results in low quality or inaccurate matching of the reference image to the sensor image. The invention described here can be used to prepare a synthetic perspective image that is better suited to faster and higher quality precision matching with the sensor image.

SUMMARY OF THE INVENTION

The present invention provides a method of producing a perspective distortion in an image, without requiring specialized computing hardware, while allowing the use of complex sensor model software for particular types of sensors (for example, FLIR and SAR) that compute and correct for geometric distortions particular to the specific types of sensors. The examples of particular geometric distortions would include lens distortions from a FLIR sensor, or layover and foreshortening distortions of a SAR sensor.

The problem solved by the invention is the generation of a perspective image that matches the viewing perspective and the characteristic image geometry of a particular sensor, without requiring the use of specialized hardware and without the computational difficulty inherent in existing image generating methods. The invention generates a synthetic perspective image in a forward-mapping manner, which solves the problem of hidden surfaces in a simple way that provides sufficient speed and adequate quality and accuracy, enabling standard reference images to be used for registering with the sensor images from all perspectives or points of view, by producing a synthetic perspective image to minimize geometric differences due to the different perspectives of the reference and sensed images. It also solves the assured assignment problem by using a novel backfilling process to ensure each pixel in the synthetic perspective image is given an appropriate value to represent the corresponding point of the scene area.

The present invention provides a method of generating a synthetic perspective image of a location on a display screen of rows and columns of pixels, or in a computer storage array of rows and columns of pixel values, from a stored database reference image of the scene area, and a corresponding digital elevation model or DEM of the scene area. The generated synthetic perspective image is constructed to geometrically match an electronically sensed image of the location, in a way that only a shift displacement between the generated synthetic perspective image and the sensed image must be measured, in order to accurately register the images with best speed. The method is described herein as being used in military aircraft to generate and display a perspective image of a target area. However, the method also has other applications, for example, in directing the movements of a robot around obstacles at a given location, or in directing the movements of a mechanical arm in a particular location, or in numerous other applications requiring a sensor image to be accurately registered to a reference, in which approximate information as to the relative positions of the sensor and scene is known, and the reference has an accurate geocoding or association to a scene model coordinate system, and is accompanied by an elevation model or three-dimensional scene model, having the same geocoding or association to the same scene model coordinate system, or with a known and accurate mathematical relationship to the same scene model coordinate system.

The method first involves directing an image sensor, for example a FLIR sensor or SAR sensor, having a line of sight so that the line of sight intersects with a particular location desired to be viewed. The image sensor produces a sensed image of the location around the line of sight.

A database stored reference image of the location is then obtained from an available database of reference images. The reference image obtained corresponds to the sensed image of the location and is comprised of a plurality of reference image pixels arranged in rows and columns.

Elevation information for the location is then obtained. The elevation information is obtained from any of a variety of available sources of the information, for example digital elevation model (DEM) information available from the United States Geological Survey (USGS) or the National Emergency Management Association (NEMA). The elevation information obtained is then associated with each pixel of the reference image, assigning each pixel an elevation value.

The reference image pixels are then oriented so that the reference image orientation corresponds to the orientation of the location relative to the image sensor line of sight. This gives the reference image the same orientation as the sensed image relative to the image sensor. It also places the reference image so that pixels at the bottom of the reference image correspond to scene locations closer to the sensor location, and pixels at the top of the reference image correspond to scene locations farther from the sensor location.

Each of the reference image pixels are then mapped into pixels of a synthetic perspective image display screen, or into a computer storage array for holding the values as a digital image, using a standard projection coordinate transformation. A front row or bottom row of the reference image pixels is mapped into a front line or bottom line of the perspective image pixels, with the image pixel value associated with each reference image pixel being assigned to the mapped perspective image pixel. The line of pixels in the perspective image mapped from a row of pixels in the reference image will follow a path through the perspective image that depends on the elevations associated with the pixels in the row of pixels in the reference image. Successive rows of the reference image pixels, upwardly across the reference image are then mapped to successive lines of the perspective image pixels, upwardly across the synthetic perspective image. The placement of successive lines of the synthetic perspective image pixels depends on the elevations associated with the pixels in the successive rows of reference image pixels mapped to each line of synthetic perspective image pixels. Depending on those elevations, a line of synthetic perspective image pixels may cross behind a previously mapped line, indicating low elevations mapped from the current row of reference image pixels are obscured by higher elevations closer to the sensor, from a previously mapped row of reference image pixels, and resulting in some pixels in the succeeding line of the synthetic perspective image not being shown. Alternatively, the lines of pixels in the synthetic perspective image may come closer together or spread farther apart, indicating differing changes in elevations between the rows of pixels in the reference image. The top or back row of the reference image pixels is last mapped to a top or back line of the perspective image pixels completing the synthetic perspective image of the sensed location.

Each of the synthetic perspective image pixels that is mapped by a reference image pixel is assigned the color value of the corresponding reference image pixel, to carry and portray the photographic information contained in the reference image. Uses of the term "color" in this description should be taken to also include the alternative meanings of "monochrome", "gray", "intensity", or whatever information, spectral or otherwise, is represented by the photographic information contained in the reference image, even if it is a synthetically constructed depiction such as the radar reflectivities shown in a synthetic aperture radar image.

It is typical that, in using a forward perspective transform, not all of the perspective image pixels will be mapped with a reference image pixel. Unmapped perspective image pixels in the rows and columns of the perspective image are identified each time a reference image pixel is mapped into a perspective image pixel. Any unmapped perspective image pixels in the column below the mapped perspective image pixel are then backfilled with the color of the mapped perspective image pixel above them in the column. In addition, unmapped perspective image pixels in a row having adjacent mapped or backfilled perspective image pixels in the same row on opposite sides of the unmapped perspective image pixel are backfilled with an interpolation of the color of the adjacent mapped perspective image pixels. The novel backfilling of the perspective image pixels fills (as needed) the pixel space in the perspective image, resulting in a synthetic perspective image of the sensed location.

If the sensor image is rotated about the sensor line of sight, the synthetic perspective image so completed is now rotated using standard image rotation means to conform to the rotation known for the sensor image.

BRIEF DESCRIPTION OF THE DRAWINGS

Further features of the present invention are revealed in the following detailed description of the preferred embodiment of the invention and in the drawing figures wherein.

DESCRIPTION OF THE PREFERRED EMBODIMENT

As stated earlier, the present invention provides a method of generating a synthetic perspective image of a location from a reference image of the location, where the generated perspective image is displayed on a typical display screen comprised of rows and columns of pixels, and recorded as a numerical array of electronically stored values for additional processing, or for storage in a computer file for later use. The description of the method to follow is made with reference to its use in a military aircraft, where the method generates and displays a synthetic perspective image of a geographic target area. However, it should be understood that the method of the invention has many different applications, for example, for generating a synthetic perspective image of a location to be used by a robot to enable movement of the robot around obstacles at the given location. In another example, the method of the invention may be employed in generating a synthetic perspective image of a location where a remotely-operated mechanical arm is located to enable movement of the mechanical arm around obstacles at the particular location. In yet another example, the method of the invention may be employed to generate a synthetic perspective image of an object where precise measurements must be made of points around that object, by making those measurements in a sensed image of that object, and then using precise registration of the reference image to the sensed image of the object to achieve the measurements.

Figure 1:
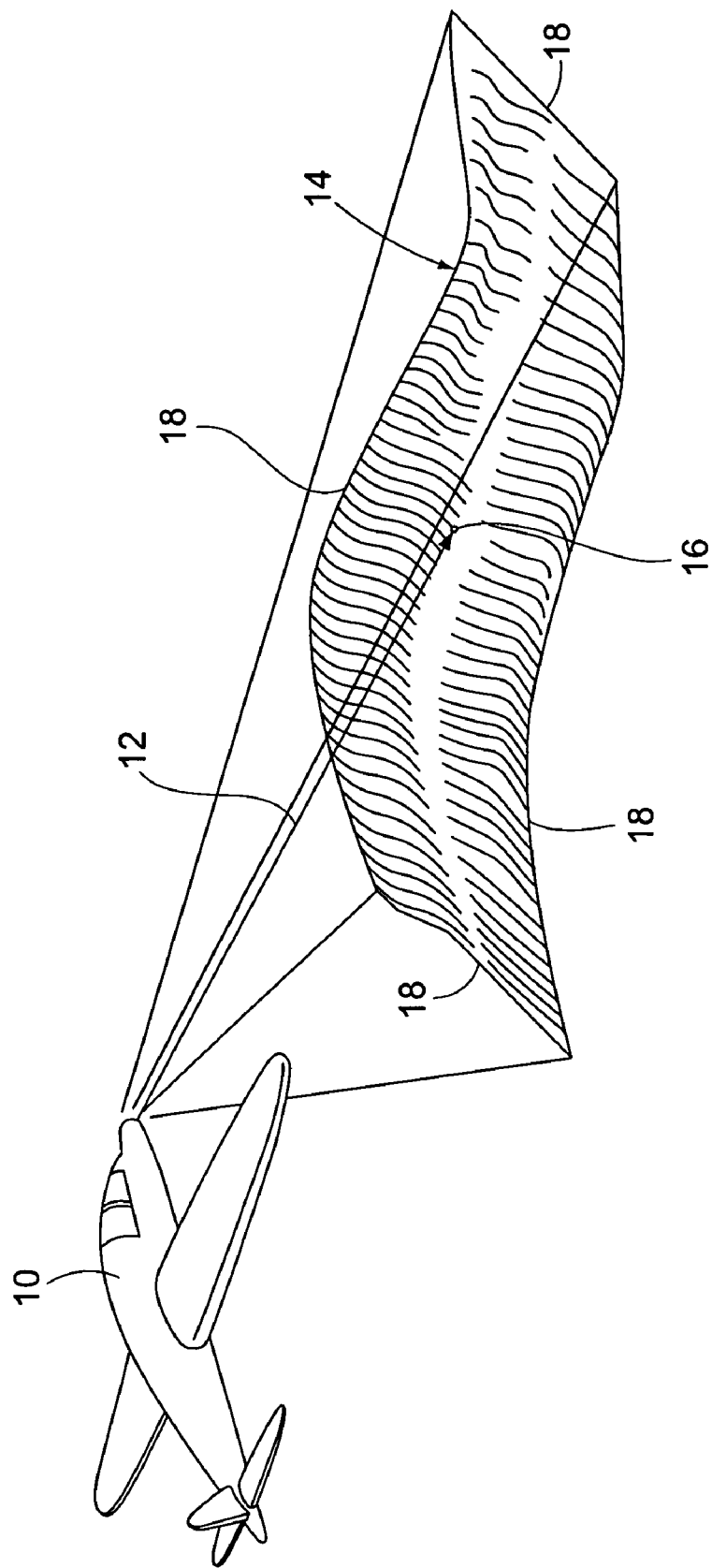
FIG. 1 is a representation of a motive source, i.e., an aircraft, having an image sensor that is directed along a line of sight that intersects with a location, in the example shown a geographic location, to produce a sensor image of the location.

FIG. 1 shows a representation of an aircraft 10 that is equipped with a forward-looking sensor such as a forward-looking infrared (FLIR) sensor or a synthetic aperture radar (SAR) sensor. The drawing figure depicts the aircraft sensor having a line of sight 12 that is directed to a geographic area 14 and intersects with the terrain of the geographic area 14 at a particular point 16. Known sensors of this type are capable of sensing the contours of the land and/or objects within predefined boundaries of the geographic area or location 14 represented by the perimeter edge 18 shown in FIG. 1. The sensor provides signals to the electronics of the aircraft 10 that produce a visual display (not shown) and recorded array (not shown) of the sensed image of the location 14 around the line of sight 16 within the sensed image boundaries 18.

The aircraft 10 is also provided with a database that includes reference images of several geographic areas or locations, including a reference image of the geographic area or location 14 that is sensed by the aircraft image sensor. A typical reference image database contains a geographically registered image that depicts a geographic area, and geographically registered elevation or height information for the geographic area, in the form of a digital elevation model (DEM). Each reference image is typically an overhead digital image of a geographic area or location that has been put into mathematical correspondence with a geographic coordinate system for the area, such as the World Geodetic System 1984, or WGS84. The correspondence is such that each pixel's location in a row and column of the digital image may be associated with a specific geographic coordinate, such as latitude and longitude in the geographic coordinate system. The correspondence operates in reverse, also, so that any geographic coordinate may be associated with a pixel row and column location in the reference image. Since many geographic locations will not be exactly the same as those in direct correspondence to pixel row and column location, it is usually necessary to force the reverse correspondence to select a single pixel location, such as by rounding the reverse correspondence computed pixel location to the nearest row and column values. On occasion, it is desirable to allow the reverse correspondence to denote fractional pixel locations, that is, locations that are mathematically in between pixel exact row and column locations, for purposes such as rotating images to a new orientation, or warping them to present a different geometric form, such as an orthographic projection.

In a similar fashion, the elevation values of the DEM have been put into mathematical correspondence with a geographic system. Usually, this geographic system is the same as that used for the reference image, or an accurate mathematical transform is established and known to exist between the two geographic systems. These elevation values, or posts, are presented as an array of rows and columns, in a manner similar to the rows and columns of pixels in the reference image. The mathematical relationship of post locations to a geographic system is normally different for the DEM and the reference image, due to differences in the corresponding geographic spacing of the pixels and posts. For example, pixels will usually have small corresponding geographic spacing, perhaps representing a ground resolution of 3.5 meters or less ground spacing between pixels, for images originating with a SPOT satellite reference image. DEM posts, on the other hand, are normally more widely spaced in corresponding ground coordinates, such as 30 meter spacing for a United States Geodetic Service Level II DEM. A reverse correspondence is also available for the DEM, which allows any geographic location to determine a row and column location in the DEM. Such row and column location may be an exact row and column, indicating a single post, or it may be a fractional location between exact row and column locations, for the purpose of warping or resampling the DEM.

Any pixel in the overhead digital image of the geographic area is given an estimated height or elevation value by interpolating between four or more height values of mutually adjacent posts in the DEM. The interpolation is done using a weighting means, based on distance from the fraction post location corresponding to the pixel to the four or more mutually adjacent posts in the DEM. Some pixels of the digital image require interpolating between only two height values of adjacent posts. Fewer still correspond exactly to individual height values. Such resampling is done by standard means, known in the art. The latitude, longitude, and elevation information for each pixel is given to an appropriate accuracy. The accuracy figure may be retained, for use in estimating accuracy in positional calculations to be carried out in applications using the perspective image. As stated earlier, DEM information is available from sources such as the United States Geological Surveys (USGS) or the National Emergency Management Association (NEMA), as well as other, Government or commercial sources.

However, some reference image databases cannot generally provide digital image information that matches the viewing perspective for all possible target sensing situations. They usually provide a single, common, usually overhead viewing perspective.

To produce the desired synthetic perspective image of the sensed geographic area, a region of interest is first selected from the reference image. Typically, the region of interest surrounds the approximated location of the center of the sensor image view, or the location of the intersection 16 of the sensor image line of sight 12 with the geographic area 14. This region of interest includes enough surrounding image information to cover an uncertainty basket, which is the region of the geographic area in which the image sensor might have been centered, given the estimated error in the location of the line of sight intersection 16 with the sensed area 14, the estimated error in the location of the aircraft image sensor in position and orientation or pointing direction relative to the geographic area 14, and a model of the aircraft image sensor imaging characteristics, such as field of view and focal length. A rectangular area is cropped from each of the reference image and the DEM to facilitate in the manipulation of the cropped reference image and cropped DEM to be described.

Figure 2:
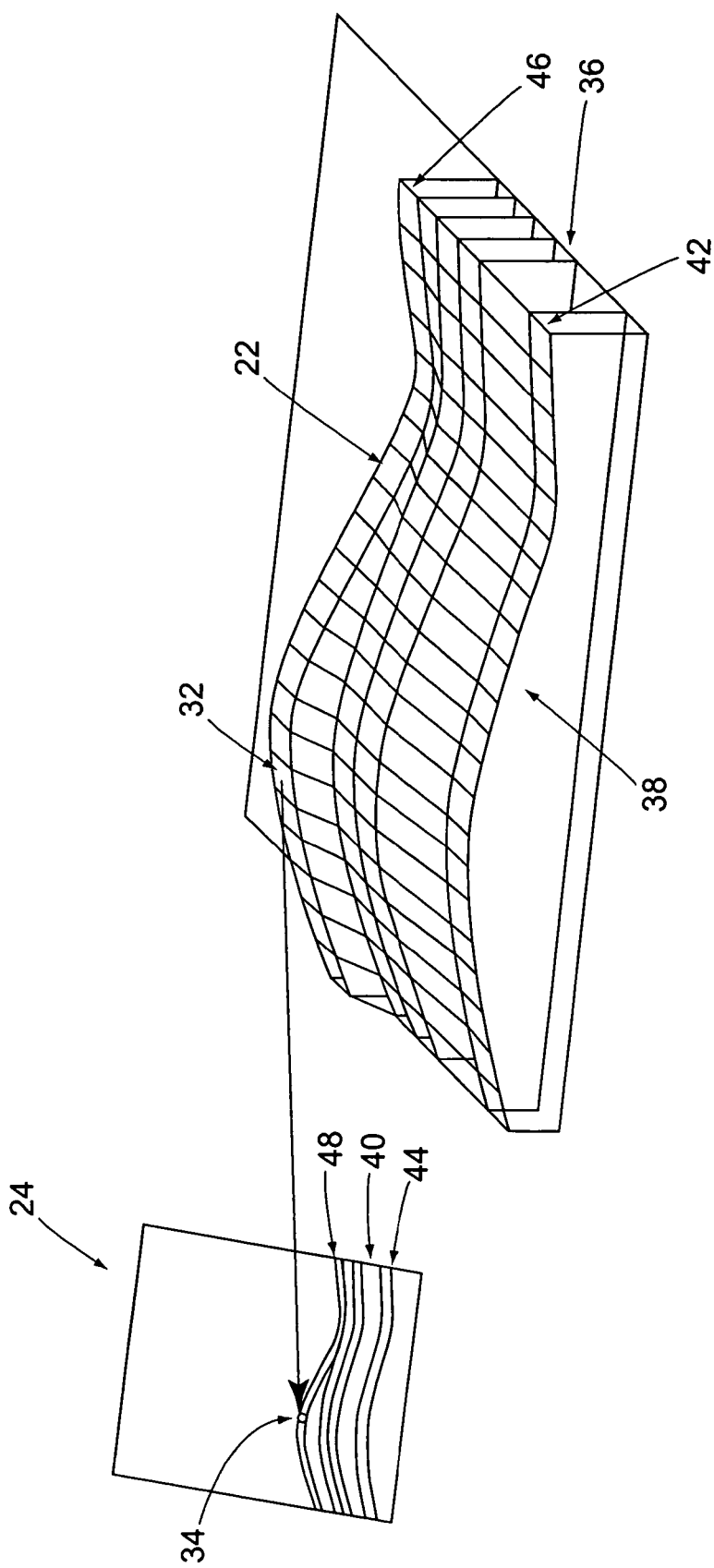
FIG. 2 is a representation of the method of mapping pixels of a reference image of the sensed location to a synthetic perspective image of the location being generated.
Figure 3:
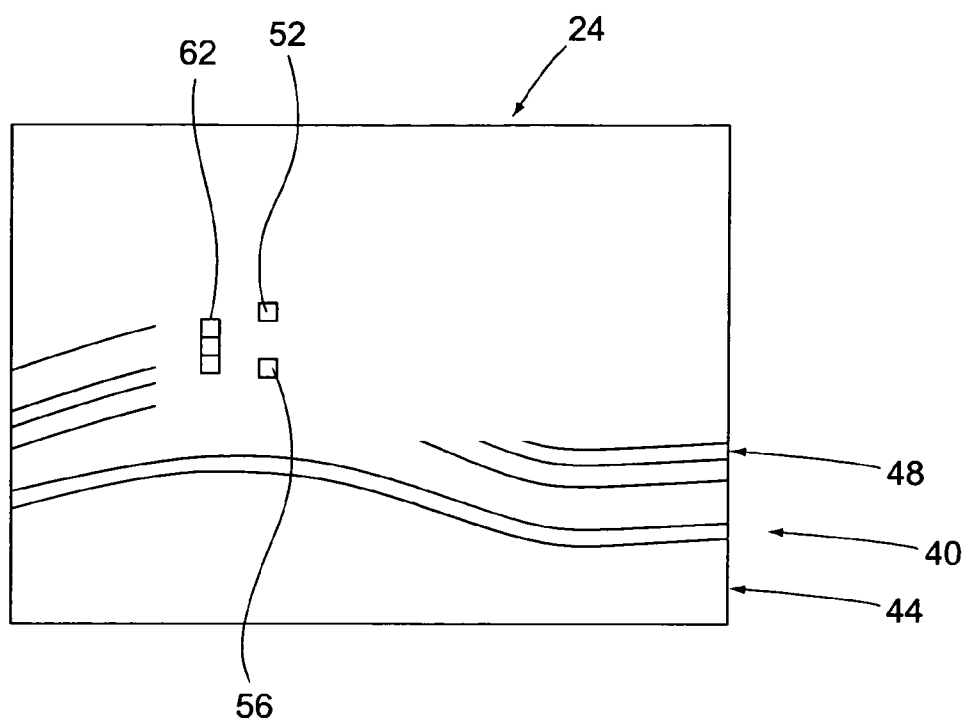
FIG. 3 is a representation of the generation of the synthetic perspective image.

The region of interest of the reference image is then rotated to the previously known azimuth of the aircraft image sensor view. This results in the reference image pixels being oriented so that the reference image orientation corresponds to the orientation of the geographic area 14 relative to the image sensor line of sight 12. This orientation of the reference image 22 is represented in FIG. 2. This gives the reference image 22 the same orientation as the sensed image of the geographic area 14 relative to the aircraft image sensor line of sight 12. It also places the reference image 22 such that pixel rows 36 at the bottom of the reference image 22 correspond to scene locations closer to the sensor, and thus closer to the image plane 24 for the synthetic perspective image. In the preferred embodiment, the reference image is oriented so that it is in alignment within less than 1.5 degrees relative to the orientation of the geographic area 14 as sensed by the aircraft image sensor line of sight 12. In orienting the reference image, latitude and longitude position information of the aircraft image sensor, as well as altitude information, compass heading information, and pitch and yaw information for the aircraft image sensor are used to adjust the orientation of the reference image 22. The reference image 22 is cropped or reduced in size prior to being oriented, so that only the portion of the reference image needed is oriented and to reduce the computational work load.

The reference image 22 may also be resampled prior to being oriented, to a ground sample resolution or pixel spacing on the ground that better matches the ground sample resolution of the sensor image, in order to further reduce the computation work load, in the case of sampling to lower resolution, or to improve the fidelity of the synthetic perspective image, in the case of sampling to higher resolution. In the preferred embodiment, the reference image 22 would be resampled to the ground sample resolution of the center pixel in the sensor image, measured along the row direction or along the direction of a line in the plane of the sensed scene perpendicular to the sensor line of sight 12 if the sensor image is rotated about the line of sight. The measured ground sample resolution of the sensor image may alternatively be taken as the smaller of the ground sample resolutions along the center row or along the center column of the sensor image.

In the preferred embodiment, the order and nature of cropping the reference image, resampling the reference image, and rotating the reference image to the orientation of the aircraft image sensor line of sight 12 is adjusted to minimize the amount of pixel information to process. Resampling may be done first, if it reduces the number of pixels that must be processed. Some cropping of the reference image before its rotation is usually desirable, to eliminate processing pixels in the reference image which will not be visible the generated synthetic perspective image scene, and hence need not be included in the rotation of the reference image. A second cropping of the reference image following its rotation is also possible, to reduce the computational burden of unneeded pixel processing in generating the synthetic perspective image.

In a similar fashion, a similar region of interest is cropped from the DEM, rotated to the same orientation as the reference image, and resampled to the same resolution as the reference image 22. A different rotation angle will usually be applied to the DEM because the original orientation of the DEM will usually not be the same as that of the original reference image. Furthermore, the DEM will often have to be resampled more finely, to match the geographic spacing of the resampled reference image. In addition, the DEM resampling is done so that each resampled DEM post represents the same geographic location as its corresponding resampled reference image pixel. In this way, the DEM posts may be taken as the third dimension coordinate, where the row and column locations of the reference image pixels and corresponding DEM posts represent the geographical location of that pixel and post. Each reference image pixel value or color then provides the visual information about that three dimensional location.

Once the region of interest from the reference image 22 is rotated to the proper alignment as depicted in FIG. 2, it is then processed into the synthetic perspective image 24.

The synthetic perspective image 24 is generated in a forward-mapping procedure which solves the hidden surface problem in a way that provides sufficient speed and adequate quality in generating the synthetic perspective image from standard reference images that are selected corresponding to the sensor image of the aircraft 10.

Briefly, the synthetic perspective image 24 is generated by mapping the cropped and oriented reference image 22 into the display of the synthetic perspective image 24. The reference image 22 is mapped to the perspective image 24 from foreground to background of the location area 14, or from the bottoms of the images to the tops of the images, row by row, and within rows, pixel-by-pixel, using the surface elevation information associated with each pixel of the reference image 22 in order to properly map pixels into locations in bottom to top order. This ordering is crucial to ensuring that foreground objects at higher elevations obscure background objects at lower elevations in the generated synthetic perspective image 24. The generated synthetic perspective pixels are blurred downward and to the sides in the synthetic perspective image display 24, to provide complete filling of the generated synthetic perspective image pixels, and assure assignment of values to all pixels in the synthetic perspective image.

FIG. 2 represents the manner in which the reference image 22 is processed or used to generate the synthetic perspective image 24 by mapping each pixel 32 of the reference image 22 individually into a pixel 34 in the image plane of the synthetic perspective image 24. This is accomplished by using any standard projection coordinate transform known in the art for mapping locations from a three-dimensional scene into a two-dimensional image plane. FIG. 2 shows the rows 36 and columns 38 of the reference image pixels in the three-dimensional reference image where each pixel of the reference image is assigned a Z-component for the height or elevation value associated with the reference image pixel. The row and column indices of the pixel 32 are assigned X-component and Y-component values to complete the three-dimensional coordinate. The information provided by the DEM is used as the Z-component in the perspective image transformation, so that the synthetic perspective image projection or display 24 gives an accurate rendering of the perspective geometry of the geographic area or location 14. The particular standard transformation employed in generating the perspective image 24 may be modified, or an additional transformation included, to adjust for sensor-specific geometric distortions that occur in the formation of the synthetic perspective image. These modifications that accommodate for known distortions in particular types of sensors are known in the art. An orthographic reference image 22, such as shown in FIG. 2, makes the projection computation to the two-dimensional synthetic perspective image 24 simpler, but a non-orthographic reference image may also be used by suitably altering the standard projection transform as is known in the art, to map from a known, non-orthographic perspective image into a new synthetic perspective image.

A front row or bottom row 42 of the reference image pixels is first mapped into a front line or bottom line 44 of the synthetic perspective image pixels with the pixel value associated with each reference image pixel being assigned to the mapped perspective image pixel. The line of pixels 44 in the perspective image 24 mapped from a row of pixels 42 in the reference image 22 will follow a path through the perspective image 24 that depends on the elevations associated with the pixels in the row of pixels 42 in the reference image 22. Successive rows 36 of the reference image pixels extending upwardly across the reference image 22 are then mapped to successive lines 40 of synthetic perspective image pixels upwardly across the synthetic perspective image 24. The placement of successive lines 40 of the synthetic perspective image pixels depends on the elevations associated with the pixels in the successive rows of reference, image pixels 36 mapped to each line 40 of synthetic perspective image pixels. Depending on those elevations, a line 40 of synthetic perspective image pixels may cross a previously mapped line, indicating low elevations mapped from the current row 36 of reference image pixels are obscured by higher elevations closer to the sensor, mapped from a previously mapped row of reference image pixels, and resulting in some pixels 34 in the succeeding line of the synthetic perspective image 24 not being shown. Alternatively, the lines 40 of pixels in the synthetic perspective image 24 may come closer together or spread farther apart, indicating differing changes in elevations between the rows 36 of pixels in the reference image 22. The top or back row 46 of the reference image pixels is last mapped to a top or back line 48 of the synthetic perspective image pixels, completing the generation of the synthetic perspective image 24 of the sensed location.

If the sensor image is rotated about the sensor line of sight 12, the synthetic perspective image so completed is now rotated using standard image rotation means to conform to the rotation known for the sensor image.

A novel aspect of the invention is the complete filling of the pixel space in the synthetic perspective image display 24. A forward transform, as used here in mapping the individual reference image pixels 32 from the reference image 22 to perspective image pixels 34 of the synthetic perspective image 24, will typically not completely cover the perspective image display 24. This means some perspective image pixels 34 will not be mapped with a reference image pixel 32. Completing the perspective image by filling in unmapped pixels is an important step in creating useful perspective images.

The novel method employed with the invention, to determine values for synthetic perspective image pixels whose values were not determined by the direct projection or mapping from the three-dimensional reference image pixels, requires processing the reference image pixels 32 by pixel rows 36, from the closest or bottommost reference image pixel row 42 successively across the reference image to the farthest or top reference image pixel row 46. As each reference image pixel row 36 is processed, it is known thereby that all closer rows of the reference image pixels have already been processed. Hence, if a three-dimensional reference image pixel 32 is projected into a pixel location on the synthetic perspective image 24 that has already been assigned or mapped a reference image pixel value, it is known that the reference image pixel being mapped is occluded or hidden from view from the viewpoint of the image sensor of the aircraft 10 and cannot be seen in the synthetic perspective image 24, so that reference image pixel is processed no further. If a three-dimensional reference image pixel 32 is projected into a pixel location on the synthetic perspective image 24 that has not been previously assigned a value, then the reference image pixel is visible and its color is assigned to the synthetic perspective image pixel 34 into which it is projected.

Figure 4:
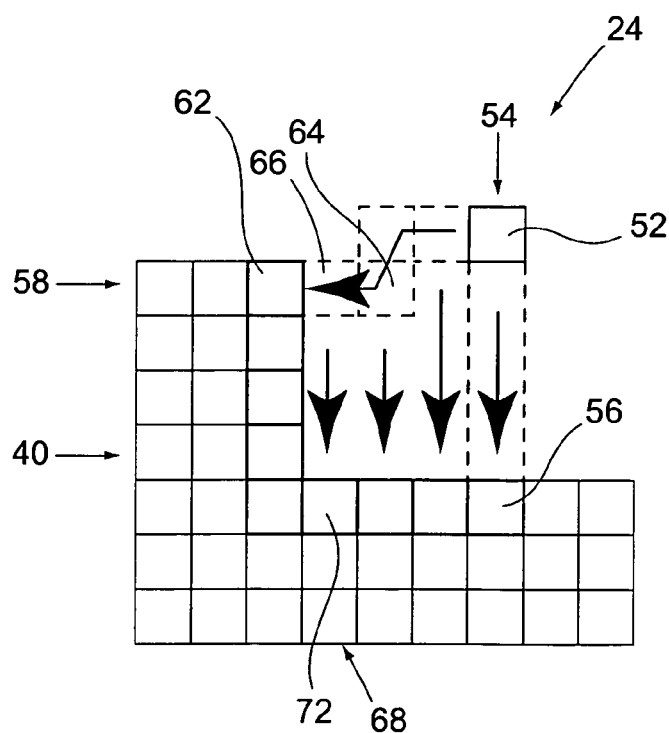
FIGS. 4 and 5 are representations of the backfilling of the synthetic perspective image pixels.

Still further, as depicted in FIG. 4, the mapped synthetic perspective image pixel 52 is used to assign a color to any synthetic perspective image pixel in the column 54 below the mapped synthetic perspective image pixel 52, which has not previously been mapped by a reference image pixel and not previously been assigned a color. It is important that the backfill be done for each row as the row is projected, and as each pixel is projected, else some later projected pixel be mapped into an unfilled pixel that would have been filled if the filling had been done as each pixel was initially mapped. The purpose behind this backfilling technique is to ensure that no pixels lacking an assigned color will be left surrounded by pixels having assigned colors in the completed perspective image. Any pixels in the synthetic perspective image 24 that are below the mapped synthetic image pixel 52 and have not been previously mapped, come from or correspond to closer locations in the reference scene area. Hence, if the perspective image pixels in the column 54 below the mapped perspective image pixel 52 have not been assigned pixel colors, those lower, unassigned pixels of the column 54 should be given the value of closer pixels from the reference image. However, all of the closer reference image pixels 32 from the reference image 22 have already been mapped to pixels 56 in the synthetic perspective image 24 due to the successive order of mapping the reference image pixel rows 36 from front to back or from bottom to top. Therefore, any remaining, unassigned pixels in that column 54 and beneath the mapped perspective image pixel 52 in the synthetic perspective image 24 are determined to be related to that presently mapped perspective image pixel 52. The colors assigned to the lower perspective image pixels in the column 54 are copied from the mapped pixel 52, when it is known that the last (or uppermost) assigned perspective image pixel 56 below the presently mapped perspective image pixel 52 in that column came from other than the next closest row of pixels in the reference image 22.

Alternatively, if the last (or uppermost) assigned perspective image pixel 56 below the presently mapped perspective image pixel 52 in a pixel column 54 came from the next closest row of pixels in the reference image, the colors assigned to perspective image pixels in that column 54 below the presently mapped perspective image pixel 52 and above the last (or uppermost) assigned perspective image pixel 56 may be determined by interpolating between the color of the last (or uppermost) assigned perspective image pixel 56 and the color of the presently mapped perspective image pixel 52, using an interpolation means such as linear interpolation.

Successive reference image pixels 32 from a given row 36 of the reference image also may or may not map onto perspective image pixels 34 in successive columns 54 in the synthetic perspective image as shown in FIG. 4. This will typically occur if the reference image 22 has a lower spatial resolution when projected to the synthetic perspective image 24, than the display of the synthetic projected image 24 presents, as may be the case in the foreground or lower areas of the synthetic perspective image 24. This is another aspect of the lack of pixel coverage in the synthetic perspective image 24 that may arise in the projection of reference image pixels 32 from the reference image 22 to the synthetic perspective image 24. The novel method to complete pixel coverage in this situation provided by the invention is to interpolate spatially to the sides, to neighboring columns 54, that is, in unmapped synthetic perspective image pixel locations in a row 58 of the synthetic perspective image pixels between the two successively mapped synthetic image pixels 62, 64 across the columns of the synthetic reference image pixels, and to treat the intermediate interpolated reference image pixels 66 as individually mapped pixels. Hence, for each intermediate interpolated reference image pixel 66, its assigned color is copied or interpolated down its column 68 to the last (or uppermost) reference image pixel 72 below it which was previously assigned a color, as if pixel 66 had actually been mapped from the reference image 22.

The spatial interpolation between the current 64 and preceding 62 mapped reference image pixels can be accomplished by any reasonable interpolation means, such as the Brezenham blind interpolation algorithm, a known prior art algorithm, and may proceed in any order, such as from the current synthetic perspective image pixel 64 to a preceding mapped synthetic perspective image pixel 62, or the reverse. It is pointed out that it is important to realize that the present synthetic perspective image pixel 64 and the preceding mapped synthetic perspective image pixel 62 may have different row and column positions, or either or both could be the same, so that the interpolation may not be a simple sequencing along a row or column, but will generally sequence on an angular, stepped path through the perspective image space as shown in FIG. 4 for interpolation from a currently mapped pixel 52 of the synthetic perspective image 24 to the last preceding currently mapped pixel 62, both of which came from the same row 36 of pixels in the reference image, and from adjacent pixels in that row. Intermediate mapped synthetic perspective image pixels 66 so interpolated in this line of pixels in the synthetic perspective image should be assigned interpolated colors determined proportionally, from the current mapped pixel 54 to the last preceding currently mapped pixel 62, or in the reverse direction, for best accuracy, where the color interpolation means may be an extension of the location interpolation means, or a separate interpolation means. When assigned a value, these pixels 52 through 62 should be treated each as a mapped pixels, and to fill any unmapped pixels in the columns 54 beneath them in the synthetic perspective image in the manner described above.

Figure 5:
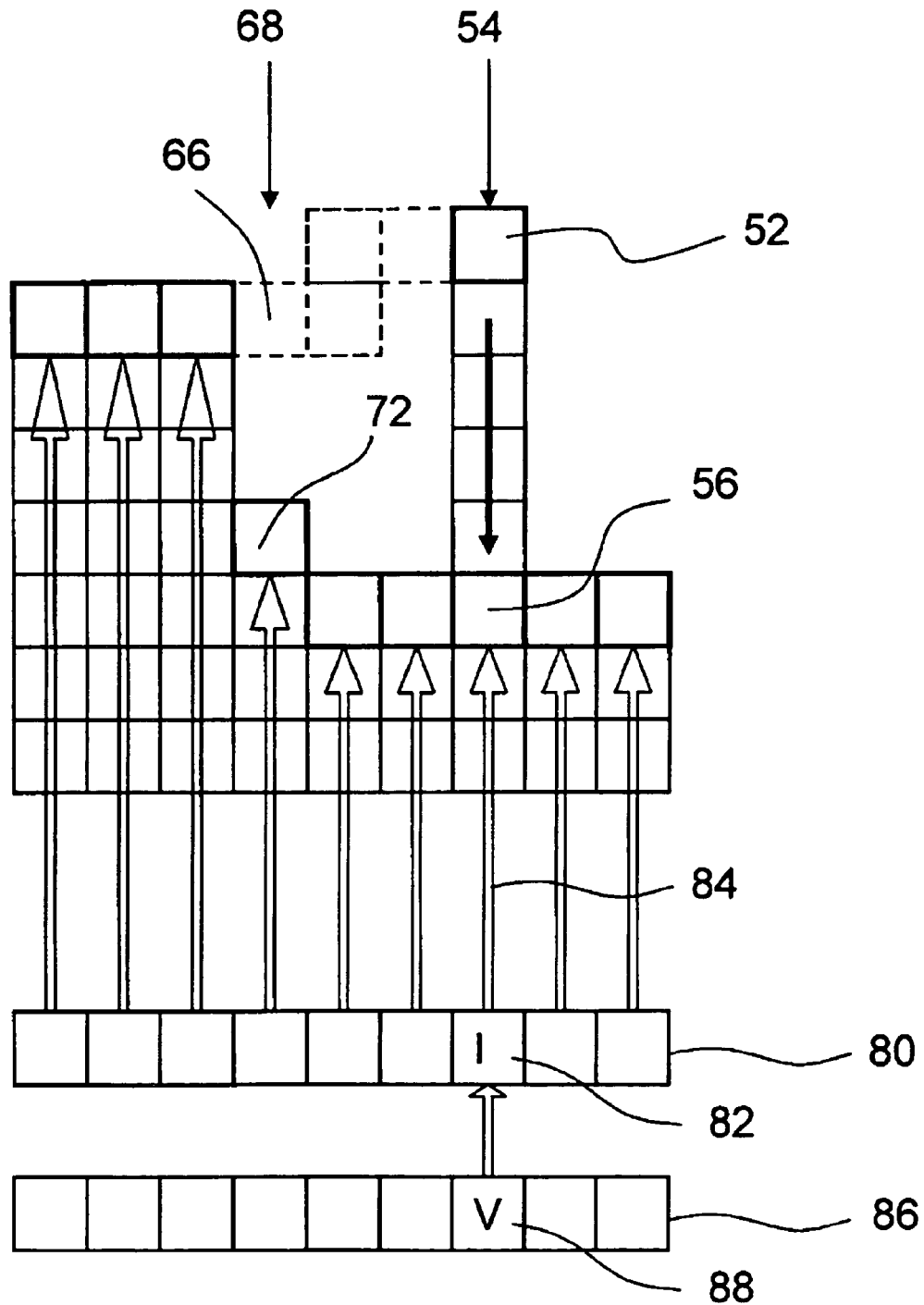

Another novel aspect of the invention, depicted in FIG. 5, gives increased efficiency of interpolation down a column of perspective image pixels 54 from the currently mapped perspective image pixel 52 to the last previously mapped perspective image pixel 56 in that column 54. It utilizes a row index array 80 of row index values 82, one for each column of pixels 54 in the synthetic perspective image, to indicate 84 where in the column 54 the last previously mapped perspective image pixel was mapped, and thus to also indicate how far down it is necessary to interpolate in that column. The row index value I in the row index array location 82 corresponding to a column 54 is the row index of the last previously mapped or horizontally interpolated pixel 56 in that column. A similar pixel value array 86 of pixel values or colors V 88 is used to hold corresponding pixel values of the last previously mapped perspective image pixels 56 for each column 54. Interpolation down a column 54 of perspective image pixels can then be easily done without checking if pixels have been assigned a value, as the interpolation proceeds from the row position of the currently mapped pixel 52 to the row position above the row indexed 82 in the row index array 80 for that column 54 containing the last previously mapped pixel 56. This use of the row index array also eliminates any need to interpret one pixel value as a sentinel value, to indicate when no value has yet been assigned to a pixel, allowing fullest use of pixel values to hold pixel color information. Interpolation is then done using the pixel color of the currently mapped pixel 52 and, when appropriate, the pixel color 88 obtained from the pixel value array 86 of the last mapped pixel 56 in that column 54, according to the previously described interpolation means. Following interpolation in the column 54, the row index value for the currently mapped perspective image pixel 52 is copied into the row index array location 82 corresponding to that column 54 of perspective image pixels, replacing the value that was there, and the pixel color of the currently mapped perspective image pixel 52 is copied into the pixel value array location 88 corresponding to that column 54 of perspective image pixels, replacing the value that was there.

Although the method of the invention has been described above by reference to a specific example, it should be understood that modifications and variations may be made to the method without departing from the intended scope of protection provided by the following claims.

The invention claimed is:

1. A method of generating a perspective image of a location from a sensed image of the location, the method comprising:
   directing an image sensor having a line of sight so that the line of sight intersects with a location and the image sensor produces a sensed image of the location around the line of sight;
   obtaining a reference image of the location that corresponds to the sensed image of the location, the reference image being comprised of a plurality of reference image pixels;
   obtaining elevation information for the location and associating elevation values to the reference image pixels;
   orienting the reference image so that the reference image orientation corresponds to an orientation of the location relative to the image sensor line of sight;
   mapping the reference image pixels into a perspective image comprised of a plurality of perspective image pixels by mapping the reference image pixels to the perspective image pixels;
   assigning the color of each reference image pixel to the perspective image pixel mapped by the reference image pixel; and
   for unmapped perspective image pixels, backfilling the unmapped perspective image pixels with an interpolation of a color of a mapped one of the reference image pixels that has been mapped into the perspective image.

2. The method of claim 1, further comprising:
   the perspective image having rows and columns of the perspective image pixels; and
   the reference image having rows and columns of the reference image pixels, and mapping each reference image pixel to a perspective image pixel from a bottom row of references image pixels upwardly through successive rows of reference image pixels to a top row of reference image pixels.

3. The method of claim 2; further comprising:
   mapping each reference image pixel to a perspective image pixel from a first side column of reference image pixels to a second side column of reference image pixels for each row of reference image pixels.

4. The method of claim 2, further comprising:
   mapping the bottom row of reference image pixels to a bottom row of perspective image pixels and ,mapping the successive rows of reference image pixels to the top row of reference image pixels to respective successive rows of perspective image pixels to a top row of perspective image pixels.

5. The method of claim 2, further comprising:
   mapping the reference image pixels to the perspective image pixels using a projection coordinate transform.

6. The method of claim 2, further compromising:
   assigning the color of each reference image pixel to the perspective image pixel mapped by the reference image pixel.

7. The method of claim 1, further comprising:
   the reference image having rows and columns of the reference image pixels;
   the perspective image having rows and columns of the perspective image pixels;
   mapping each reference image pixel from a bottom row of the reference image pixels through successive rows of the reference image pixels across the reference image to a top row of the reference image pixels, to a respective bottom row of perspective image pixels through successive rows of the perspective image pixels across the perspective image to a top row of the perspective image pixels.

8. The method of claim 7, further comprising:
   wherein said backfilling the unmapped perspective image pixels in a column that have not been mapped by a reference image pixel with an interpolation of the color of a mapped perspective image pixel is performed such that the backfilling is performed in a succession row of perspective image pixels and in the same column of the unmapped perspective image pixel.

9. The method of claim 7, further comprising:
   horizontally backfilling unmapped perspective image pixels that have not been mapped by a reference image pixel with an interpolation of the color of a mapped perspective image pixel horizontally adjacent the unmapped perspective image pixel.

10. The method of claim 1, further comprising:
    providing the image sensor on an aircraft.

11. The method of claim 1, further comprising:
    obtaining latitude and longitude information, altitude information, compass heading information, and pitch and yaw information for the image sensor as the image sensor senses the sensed image, and using the information to obtain the reference image.

12. The method of claim 1, further comprising:
    resampling the elevation information for the location prior to associating the elevation values to the reference image pixels.

13. A method of generating a perspective image of a location from a sensed image of the location, the method comprising:
    providing a mobile image sensor and moving the image sensor to a position where the image sensor produces a sensed image of a location;
    obtaining position and orientation information of the sensed image relative to the image sensor;
    obtaining a reference image of the location, the reference image being comprised of a plurality of reference image pixels arranged in rows and columns;
    obtaining elevation information for the location and associating an elevation value to each reference image pixel;
    moving the reference so that the reference image has the same orientation as the sensed image relative to the image sensor;
    mapping the reference image pixels into a perspective image comprised of a plurality perspective image pixels arranged in rows and columns by mapping each of the reference image pixels to a perspective image pixel;
    assigning the color associated with each reference image pixel to the perspective image pixel mapped by the reference image pixel; and identifying unmapped perspective image pixels in rows and columns of the perspective image pixels that have mapped perspective image pixels and backfilling the unmapped perspective image pixels in a column with an interpolation of the color of a mapped perspective image pixel in the column above the unmapped pixel.

14. The method of claim 13, further comprising:

resampling the elevation information for the location prior to associating the elevation values to the reference image pixels.

15. The method of claim 13, further comprising:

mapping each reference image pixel from a bottom row of the reference image pixels to a bottom row of the perspective image pixels, then from successive rows of reference image pixels through successive rows of the perspective image pixels, and then from a top row of the reference image pixels to a top row of perspective image pixels.

16. The method of claim 13, further comprising:

horizontally backfilling the unmapped perspective image pixels with an interpolation of the color of adjacent mapped perspective image pixels horizontally adjacent unmapped perspective image pixel.

17. The method of claim 16, further comprising:

using an array of row index values, one for each column of the synthetic perspective image, with each value giving the row index of the last previously projection mapped or last previously interpolation mapped pixel in the corresponding column.

18. The method of claim 16, further comprising:

using an array of pixel color values, one for each column of the synthetic perspective image, with each value giving the color of the last previously projection mapped or last previously interpolation mapped pixel in the corresponding column.

19. The method of claim 16, further comprising:

retaining the row index of the last projection mapped pixel in a column, and using it with the row index of the current projection mapped pixel in that column, to direct the column interpolation means.

20. The method of claim 19, further comprising:

retaining the color value of the last projection mapped pixel in a column and using it with the color value of the current projection mapped pixel in that column, to determine an interpolated color for each interpolated pixel in that column.

21. The method of claim 16, further comprising:

retaining row and column indices of the last projection mapped pixel, and using those with the row and column indices of the current projection mapped pixel, to direct the interpolation means across columns for successive projection mapped pixels.

\* \* \* \* \*

UNITED STATES PATENT AND TRADEMARK OFFICE
CERTIFICATE OF CORRECTION

PATENT NO. : 7,580,591 B2  Page 1 of 1
APPLICATION NO. : 11/174036
DATED : August 25, 2009
INVENTOR(S) : Lawrence A. Oldroyd It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1055 days.

Signed and Sealed this

Fourteenth Day of September, 2010

David J. Kappos
*Director of the United States Patent and Trademark Office*